United States Patent [19]

Kawazura et al.

[11] Patent Number: 5,679,728
[45] Date of Patent: Oct. 21, 1997

[54] SURFACE-TREATED CARBON BLACK AND RUBBER COMPOSITION CONTAINING SAME

[75] Inventors: Tetsuji Kawazura; Hiroyuki Kaido; Kouichi Ikai; Fumito Yatsuyanagi; Masayuki Kawazoe, all of Hiratuska, Japan

[73] Assignee: The Yokohama Rubber Co., Ltd., Tokyo, Japan

[21] Appl. No.: 552,060

[22] Filed: Nov. 2, 1995

[30] Foreign Application Priority Data

Nov. 11, 1994 [JP] Japan .................. 6-277792
Feb. 6, 1995 [JP] Japan .................. 7-018159
Sep. 14, 1995 [JP] Japan .................. 7-237030

[51] Int. Cl.$^6$ .................................. C08K 3/00
[52] U.S. Cl. .................. 523/215; 523/210; 523/216; 524/492; 524/493; 524/495; 524/496; 423/449.2; 423/460
[58] Field of Search ............... 523/210, 215, 523/216; 524/492, 493, 495, 496; 423/449.2, 460

[56] References Cited

U.S. PATENT DOCUMENTS 5,159,009  10/1992  Wolff et al. ............... 524/495
5,200,440  4/1993   Takago et al. ............. 523/213

FOREIGN PATENT DOCUMENTS 0 468 140   1/1992   European Pat. Off. .
27 03 181   7/1977   Germany .
35 02 494   8/1985   Germany .
63-63755    3/1988   Japan .
3-239737    10/1991  Japan .
3-252431    11/1991  Japan .
3-252433    11/1991  Japan .
A-487 232   3/1970   Switzerland .
1139620     1/1969   United Kingdom .

*Primary Examiner*—Edward J. Cain
*Attorney, Agent, or Firm*—Finnegan, Henderson, Farabow, Garrett & Dunner

[57] ABSTRACT

A rubber composition containing a cross-linkable rubber component and a carbon black having silica adhered to the surface thereof and a silica surface-treated carbon black suitable for use in tire tread where the surface-treated carbon black has a nitrogen specific surface area ($N_2SA$) of 20 to 300 $m^2/g$, a ratio $IA_o/IA_f$ of the adsorption amount of iodine ($IA_o$) and the adsorption amount of iodine after treatment by hydrogen fluoride ($IA_f$) of at least 0.30 but less than 1.0, and a ratio $IA_e/IA_{ef}$ of the adsorption amount of iodine after extraction from a rubber compound ($IA_e$) and the value of the same after treatment by hydrogen fluoride ($IA_{ef}$) of at least 0.30 but less than 1.0.

12 Claims, 1 Drawing Sheet

● --- COMPARATIVE EXAMPLE 1~3 (CARBON BLACK IS FORMULATED)

○ --- COMPARATIVE EXAMPLE 4~6 (SILICA IS FORMULATED)

□ --- EXAMPLE 1~3 (SILICA SURFACE-TREATED CARBON BLACK 1+ SILANE COUPLING AGENT)

■ --- EXAMPLE 4~6 (SILICA SURFACE-TREATED CARBON BLACK 2+ SILANE COUPLING AGENT)

△ --- EXAMPLE 7~8 (SILICA SURFACE-TREATED CARBON BLACK 1)

▲ --- EXAMPLE 9~10 (SILICA SURFACE-TREATED CARBON BLACK 2)

SURFACE-TREATED CARBON BLACK AND RUBBER COMPOSITION CONTAINING SAME

BACKGROUND OF THE INVENTION

1. Field of the Invention

The present invention relates to a rubber composition and to a carbon black having silica adhered to or deposited on the surface thereof (hereinafter referred to as "silica surface-treated carbon black"). More specifically, it relates to a rubber composition suitable for use in tire treads, undertreads, and side treads and a rubber composition suitable for use in conveyor belts, hoses, rubber shock absorbers, industrial rolls, crawler belts, and the like and also relates to a silica surface-treated carbon black suitable for compounding in the rubber composition.

2. Description of the Related Art

In most cases, a rubber compound is used for applications subjected to repeated deformation. However, when the tan δ of the high temperature region (for example 60° C.) of the rubber compound is high, the amount of heat generated during use is high, and therefore, the tire or other product obtained therefrom tends to break earlier. Accordingly, it has been desired to reduce the high temperature region tan δ while maintaining the grip on wet roads, the abrasion resistance, the breaking strength, and other performance. For example, in a tire compound, to improve the fuel economy and durability, it is necessary to reduce the tan δ in the high temperature region (40° C. to 100° C.) in particular, at 60° C. but in general the inversely proportional property of the braking performance (for example, the wet grip) etc. fall, and therefore, it becomes necessary to maintain those properties.

As such prior art, for example, Japanese Unexamined Patent Publication (Kokai) No. 3-239737 proposes to formulate a silica filler into solution polymerization SBR or a blend thereof with a diene rubber. Further, Japanese Unexamined Patent Publication (Kokai) No. 3-252431 proposes to formulate a silica filler and a silane coupling agent into a solution polymerization SBR or a blend thereof with a diene rubber. Further, Japanese Unexamined Patent Publication (Kokai) No. 3-252433 proposes to formulate a silica filler and a silane coupling agent into a modified solution polymerization BR or SBR having silane at the terminal group thereof.

According to the above proposals, however, while it is possible to reduce the high temperature region tan δ, without reducing the braking performance and other properties, the silica filler has a high self-cohesiveness, and therefore, is not easy to disperse and, as a result, there is the problem of a poor workability. Further, the silica filler is nonconductive, so when used alone, without using together with enough amount of carbon black, for a tire, in particular, a tire tread compound, the flow of the static electricity to the road surface becomes insufficient and, as a result, the discharge caused by the electrostatic breakdown causes noise to the radio and other electronic equipment and sometimes causes erroneous operation. Further, even when similarly used as above for a belt conveyor or hose etc., there is the problem of an accompanying danger of ignition of flammable material due to the static electricity. In addition, a high priced silane coupling agent is necessary to use and therefore there is the problem of the cost increase.

SUMMARY OF THE INVENTION

Accordingly, the object of the present invention is to provide a surface-treated carbon black for rubber reinforcement and a rubber composition containing the same, which improve the durability when used for various rubber products by relatively lowering the high temperature region tan δ and which solve the problem in processing of the low electroconductivity and further the difficulty in dispersion of the silica. In particular, when used as a tire compound, the object of the present invention is to provide a rubber composition, particularly for a tire tread, undertread, and side tread, which gives a low fuel consumption and superior durability (low tan δ at high temperature region), without reducing the braking performance and other tire performance.

Another object of the present invention is to provide a silica surface-treated carbon black which suppresses a rise in the electrical resistance which is a defect of silica, and improves the dispersibility.

In accordance with the present invention, there is provided a rubber composition comprising at least one cross-linkable rubber component and a silica surface-treated carbon black having silica adhered to the surface thereof.

BRIEF DESCRIPTION OF THE DRAWINGS

The present invention will be better understood from the description set forth below with reference to the accompanying drawing of FIG. 1, which is a graph showing the temperature dependencies of the tan δ of the rubber compositions of Examples 1 to 10 and Comparative Examples 1 to 6.

DESCRIPTION OF THE PREFERRED EMBODIMENTS

Figure 1:
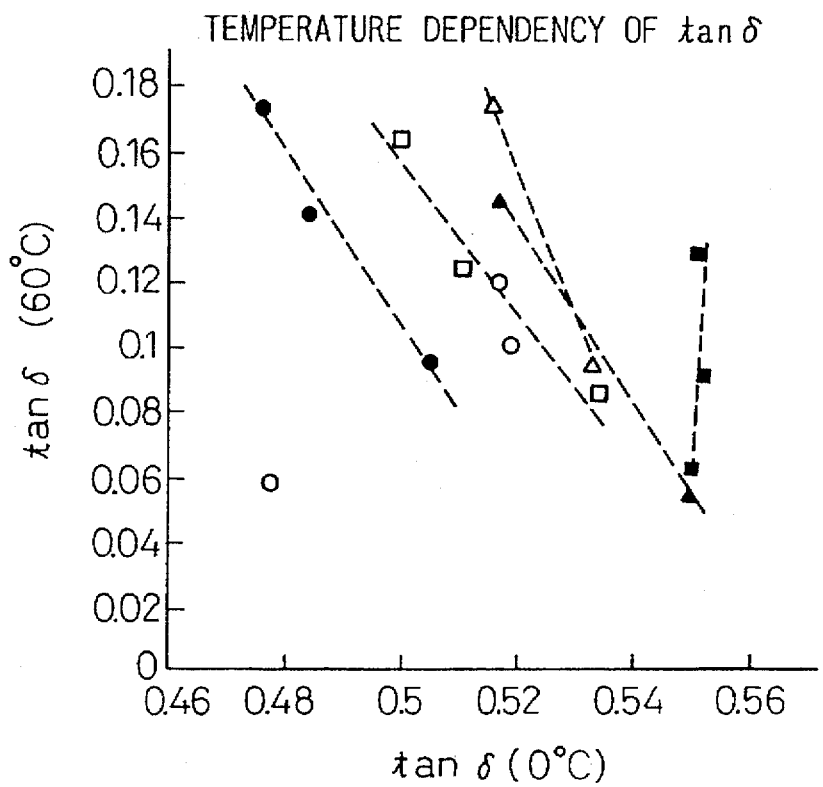

In accordance with the present invention, as explained above, a carbon black having silica adhered to or deposited on the surface thereof (hereinafter described as "silica surface-treated carbon black") is formulated into one or more cross-linkable rubber. The adhesion amount of the silica in the silica surface-treated carbon black is 0.1 to 50% by weight, more preferably 0.3 to 30% by weight. When the content of the silica is too small, the balance between tan δ at the high temperature region (40° C. to 100° C.) and tan δ at the low temperature region (near 0° C.) will not be improved, while conversely when too great, it is not preferable that the electroconductivity will fall and the cohesive power of the filler will become stronger and dispersion during the mixing will become insufficient.

The silica surface-treated carbon black according to the present invention is not particularly limited by the method of production, but may be produced by, for example, producing the carbon black by an oil furnace method etc. first, then inserting it into an atmosphere for causing the production of white carbon and causing silica to adhere to the surface of the carbon black. As one example, it may be produced by the method described in Japanese Unexamined Patent Publication (Kokai) No. 63-63755. That is, the carbon black is made to disperse in water, followed by adjusting the pH to at least 6, preferably 10 to 11, maintaining the temperature to at least 70° C., particularly 85° to 95° C., and, during that time, causing, for example, sodium silicate to hydrolyze to cause amorphous silica to adhere to or deposit on the surface of the particles of carbon black.

The total amount of the silica in the rubber reinforcing agent produced by this method does not necessarily have to be physically or chemically bonded to the surface of the carbon black, but examination by a transmission type electron microscope (about 600,000 times) confirmed that the silica was adhered onto the carbon black.

The silica surface-treated carbon black according to the present invention preferably has a nitrogen specific surface area ($N_2SA$) of 20 to 300 $m^2/g$, more preferably 25 to 250 $m^2/g$, a ratio $IA_o/IA_f$ of the adsorption amount of iodine ($IA_o$) and the adsorption amount of iodine after treatment by hydrogen fluoride ($IA_f$) of at least 0.30 but less than 1.0, and a ratio $IA_e/IA_{ef}$ of the adsorption amount of iodine after extraction from a rubber compound ($IA_e$) and the value of the same after treatment by hydrogen fluoride ($IA_{ef}$) of at least 0.30 but less than 1.0. When the nitrogen specific surface area is less than 20 $m^2/g$, the reinforcement of the rubber is insufficient and the traction on wet roads and the abrasion resistance tends to decrease, while conversely when over 300 $m^2/g$, kneading into the rubber becomes difficult and poor dispersion tends to occur. Further, when the value of $IA_o/IA_f$ is less than 0.30, the performance becomes close to that of silica and there is a tendency for difficulty in obtaining the properties aimed at by the present invention. Further, when the value of $IA_e/IA_{ef}$ is less than 0.30, the viscosity of the unvulcanized rubber and a delay in vulcanization tend to occur. Note that a value of $IA_e/IA_{ef}$ of carbon black is 1.0.

The rubber component compounded in the rubber composition according to the present invention include any cross-linkable rubber components, which may be used alone or in any mixture thereof.

The cross-linkable rubber usable in the present invention include, for example, natural rubber (NR), various butadiene rubbers (BR), various styrene-butadiene copolymer rubbers (SBR), polyisoprene rubber (IR), butyl rubber (IIR), acrylonitrile butadiene rubber, chloroprene rubber, ethylene-propylene copolymer rubber, ethylene-propylene-diene copolymer rubber, styrene-isoprene copolymer rubber, styrene-isoprene-butadiene copolymer rubber, isoprene-butadiene copolymer rubber, chlorosulfonated polyethylene, acryl rubber, epichlorohydrin rubber, polysulfide rubber, silicone rubber, fluororubber, urethane rubber, etc. When using a blend, there is no particular limitation to the blending ratio.

According to the present invention, the silica surface-treated carbon black is preferably compounded in an amount of 10 to 200 parts by weight, particularly preferably 15 to 150 parts by weight, based on 100 parts by weight of the rubber component. When the amount formulated is too small, the desired effect cannot be obtained, while conversely when too large, the hardness rises too much and the workability falls and there is a danger of the practicality as a rubber material becoming poor, and therefore, these are not preferable.

The rubber composition according to the present invention may use, in addition to the silica surface-treated carbon black, any carbon black and/or silica usually compounded into rubber compositions.

The amounts of the ordinary carbon black and/or silica compounded should be 10 times or less of the weight of the silica surface-treated carbon black, preferably not exceed 8 times. When the amount of the carbon black is too large, the desired effect cannot be obtained, so this is not preferable.

In a preferable embodiment of the rubber composition according to the present invention, rubber compositions for a tire tread, undertread, and side tread are provided.

The rubber which may be compounded, as a rubber component, in a rubber composition for a tire tread and undertread may include at least one diene made a rubber selected from natural rubber (NR), polyisoprene rubber (IR), styrene-butadiene copolymer rubber (SBR), polybutadiene rubber (BR), butyl rubber (IIR), acrylonitrile butadiene rubber (NBR), etc.

On the other hand, for a tire side tread, at least one diene rubber selected from NR, BR, BR containing 1,2-syndiotactic polybutadiene, NR or BR containing microfilaments (such as nylon), etc. This is because a rubber for side tread is required to have in particular a superior flexural fatigue performance and cut growth resistance.

The rubber composition for a tire tread, undertread, and side tread according to the present invention contains therein, as a filler, a filler composed of preferably at least 10% by weight more preferably 20 to 100% by weight, of silica surface-treated carbon black, and preferably 90 to 0% by weight, more preferably 80 to 0% by weight, of carbon black based on 100 parts by weight of the rubber component, in an amount of preferably 30 to 150 parts by weight, more preferably 40 to 120 parts by weight, based on 100 parts by weight of the rubber component in the case of tire tread, preferably 30 to 120 parts by weight, more preferably 40 to 100 parts by weight in the case of undertread, and preferably 30 to 100 parts by weight, more preferably 40 to 90 parts by weight in the case of side tread. When the amount of the filler compounded is too small, the tensile strength etc. of the rubber composition is decreased, and therefore, this is not preferred, contrary to this, when too large, the hardness and heat generation accompanying the deformation etc. are too increased and the viscosity of the rubber composition before vulcanization becomes higher, and therefore, this is not preferred either. Note that the content of the silica in the silica surface-treated carbon black is, in all cases, 0.1 to 50% by weight, preferably 0.3 to 30% by weight, of the filler. When the adhesion amount of the silica is too small, the balance between the tan δ at a high temperature region (40° C. to 100° C.) and the tan δ at a low temperature region (near 0° C.) is not improved and further the effect of reduction of the temperature dependency of the E' does not appear, and therefore, this is not preferred, while conversely is too large, the electroconductivity is too decreased, the cohesive power of the filler becomes stronger, and the dispersion during mixing becomes insufficient, and therefore, this is not preferred.

The carbon black having silica adhered to (or deposited on) the surface thereof in the present invention preferably, in the case of a tire tread or undertread, has a nitrogen specific surface area (measured according to ASTM D3037) of 90 to 250 $m^2/g$, more preferably 90 to 200 $m^2/g$ and a DBP oil adsorption (measured according to JIS (i.e., Japanese Industrial Standard) K 6221) of 90 to 180 ml/100 g. When the nitrogen specific surface area of the carbon black is too low, the abrasion resistance, tensile strength, etc. become lower, and therefore, this is not preferred. Conversely, when too high, the dispersion at the time of kneading of the rubber becomes difficult, and therefore, this is not preferred either.

On the other hand, in the case of a rubber composition for a side tread, the carbon black having silica adhered to the surface thereof preferably has a nitrogen specific surface area of 30 to 120 $m^2/g$, more preferably 35 to 120 $m^2/g$ and a DBP oil adsorption of 90 to 180 ml/100 g, more preferably 100 to 170 ml/100 g. When the value is too low, again the tensile strength, modulus, etc. become lower, and therefore, this is not preferred. Conversely, when too high, the heat generated becomes larger with the nitrogen specific surface area, while with a DBP oil adsorption of less than 90 ml/100 g, the cut resistance is lowered, while conversely with one over 180 ml/100 g, the cut growth resistance is lowered, and therefore, this is not preferred.

The properties of the carbon black having no silica adhered thereto, which is compounded in the rubber composition for a tire tread, undertread, and side tread of a preferred embodiment of the present invention are not particularly limited, but preferably is any carbon black normally used for compounding with rubber, for example, from FEF grade to SAF grade carbon in terms of the grade of the particle size.

According to the preferable embodiment of the present invention, it is possible to compound, into the above-mentioned rubber composition, a silane coupling agent in an amount of formulation S (parts by weight) satisfying the following expression with respect to the weight W (parts by weight) of the silica surface-treated carbon black:

$$W \times 0.05 \times [1-(IA_o/IA_f)] \leq S \leq W \times 0.02$$

wherein, $IA_o$ is the adsorption amount of iodine of the silica surface-treated carbon black and $IA_f$ is the adsorption amount of fluorine after treating by hydrogen fluoride.

When the amount of mixture of the silane coupling agent is too large, not only there is no particular improvement in the physical properties, but also the cost rises and the scorch time shortens, and therefore, this is not preferred.

The silane coupling agent usable in the preferred embodiment of the present invention may include any silane coupling agent which has conventionally been compounded together with a silica filler in a rubber composition. Examples of such a silane coupling agent are vinyltrichlorosilane, vinyltrimethoxysilane, vinyltriethoxysilane, vinyltris($\beta$-methoxyethoxy) silane, $\beta$-(3,4-epoxycyclohexyl)ethyltrimethoxysilane, $\gamma$-glycidoxypropyltrimethoxysilane, $\gamma$-glycidoxypropylmethyldiethoxysilane, $\gamma$-glycidoxypropyltriethoxysilane, $\gamma$-methacryloxypropylmethyldimethoxysilane, $\gamma$-methacryloxypropyltrimethoxysilane, $\gamma$-methacryloxypropylmethyldiethoxysilane, $\gamma$-methacryloxypropyltriethoxysilane, N-$\beta$(aminoethyl)$\gamma$-aminopropylmethyldimethoxysilane, N-$\beta$(aminoethyl)$\gamma$-aminopropyltrimethoxysilane, N-$\beta$(aminoethyl)$\gamma$-aminopropyltriethoxysilane, $\gamma$-aminopropyltrimethoxysilane, $\gamma$-aminopropyltriethoxysilane, N-phenyl-$\gamma$-aminopropyltrimethoxysilane, $\gamma$-chloropropyltrimethoxysilane, $\gamma$-mercaptopropyltrimethoxysilane, bis-(3-[triethoxysilyl]-propyl)-tetrasulfane, etc.

The rubber composition of the present invention may include, in addition to the above starting rubber, the silica surface-treated carbon black, and any silane coupling agent, any additives normally used in the rubber industry, for example, sulfur, organic peroxide, a softening agent, an antioxidant, a vulcanizing accelerator, a filler, a plasticizer, etc. if desired or necessary, in a suitable amount.

EXAMPLES

The present invention will now be further illustrated in detail by, but is by no means limited to the following Examples.

Preparation of Silica Surface-Treated Carbon Black

The silica surface-treated carbon black was prepared by the following method. That is, carbon black slurry was prepared by an ordinary method and was warmed to 90° C., then diluted JIS No. 3 sodium silicate was added over 4 hours by a constant delivery pump, the pH was maintained at 5 to 10 by dilute sulfuric acid and an aqueous solution of sodium hydroxide, whereby silica was deposited on the surface of the carbon black. Next, the pH was adjusted to 6 and the solution was allowed to stand for 6 hours, then was filtered, rinsed, and dried to obtain the desired substance. The content of the silica was changed by adjusting the amount of the sodium silicate added.

The content of the silica in the silica surface-treated carbon black (CB) was found by the following formula after calcifying the silica surface-treated carbon black in an electric furnace at 600° C., then performing the following treatment along with hydrogen fluoride:

Silica content (%)=[(weight of surface treated CB—weight reduction after treatment by hydrogen fluoride)/(weight of surface-treated CB)]×100

The properties of the surface-treated carbon black thus prepared were as shown in the following Table. The method of measurement was as shown below:

Nitrogen specific surface area: ASTM D3037

Iodine adsorption: JIS K6221 "Rubber Use Carbon Black Test Method"

Hydrogen fluoride treatment: A sample of approximately 200 mg was taken and placed in a polyethylene beaker and was wet with distilled water, then 5 mg of hydrogen fluoride was added. This was stirred, then allowed to stand for 5 minutes, then was suction filtered. The resultant product was thoroughly washed with distilled water and then dried.

TABLE I

| | Surface treated CB1 | Surface treated CB2 | Surface treated CB3 | Surface treated CB4 | Surface treated CB5 | Surface treated CB6 | Surface treated CB7 |
|---|---|---|---|---|---|---|---|
| Type of carbon used | N339 (HAF) | | | N110 (SAF) | | | N550 (FEF) |
| Nitrogen specific surface area of carbon used (m²/g) | | 93 | | | 142 | | 42 |
| DBP oil adsorption of carbon used (ml/100 g) | | 119 | | | 115 | | 115 |
| Silica content (wt %) | 2 | 22 | 74 | 3 | 25 | 58 | 5 |

Examples 1 to 10 and Comparative Examples 1 to 6

Various rubber compositions were prepared by mixing and kneading by a Banbury mixer and kneading roll machine by the formulation shown in Table II (Comparative Examples 1 to 6) and Table III (Examples 1 to 10) by an ordinary method. These rubber compositions were press-vulcanized at 160° C. for 20 minutes to prepare the desired test pieces which were then subjected to various tests and measurements of physical properties. The test methods were as follows:

The dynamic elasticity, that is, E', and tan δ (0° C. and 60° C.) were measured using a spectrometer made by Tokai Seiki Seisakusho at an amplitude of ±2%, a vibration of 20 Hz, and a static strain of 10%.

The electrical resistance was measured according to the method of ASTM D991 and, for the values marked with the asterisk in the Table, according to JIS K6911. The dispersibility of the reinforcing agent was evaluated by the 5-point method based on the number and size of the cohesive masses present in a cross-section when cutting a sheet of the cross-linked compound by a razor and then examining the cross-section by an optical microscope (observed at 100 times). The larger the number of points, the better the dispersibility.

The results are shown in Table II (Comparative Examples 1 to 6) and Table III (Examples 1 to 10).

TABLE II

| | | | | | | (Parts by weight) |
|---|---|---|---|---|---|---|
| | Comp. Ex. 1 | Comp. Ex. 2 | Comp. Ex. 3 | Comp. Ex. 4 | Comp. Ex. 5 | Comp. Ex. 6 |
| NR*[1] | 50 | 50 | 50 | 50 | 50 | 50 |
| SBR*[2] | 50 | 50 | 50 | 50 | 50 | 50 |
| Carbon black*[3] | 40 | 50 | 60 | — | — | — |
| Silica*[4] | — | — | — | 40 | 50 | 60 |
| Surface-treated CB1*[5] | — | — | — | — | — | — |
| Surface-treated CB2*[6] | — | — | — | — | — | — |
| Silane coupling agent*[7] | — | — | — | 4 | 5 | 6 |
| Zinc oxide | 3 | 3 | 3 | 3 | 3 | 3 |
| Stearic acid | 1 | 1 | 1 | 1 | 1 | 1 |
| Anti-oxidant*[8] | 1 | 1 | 1 | 1 | 1 | 1 |
| Sulfur | 2 | 2 | 2 | 2 | 2 | 2 |
| Vulcanizing accelerator*[9] | 1.5 | 1.5 | 1.5 | 1.5 | 1.5 | 1.5 |
| tan δ (0° C.) | 0.505 | 0.484 | 0.476 | 0.478 | 0.519 | 0.517 |
| tan δ (60° C.) | 0.095 | 0.141 | 0.173 | 0.058 | 0.1 | 0.119 |
| Electrical resistance Ωcm | $5.6 \times 10^5$ | $2.1 \times 10^3$ | $2.4 \times 10^3$ | $3.0 \times 10^{13}$ | $2.8 \times 10^{13}$ | $2.1 \times 10^{13}$ |
| Dispersibility of reinforcing agent | 3 | 3 | 3 | 1 | 2 | 2 |
| Properties of Reinforcing Agents Used in Table II | | | | | | |
| Properties of reinforcing agent mixed in | 94 | 94 | 94 | 193 | 193 | 193 |
| Nitrogen specific surface area (m²/g) | | | | | | |
| Iodine adsorption (mg/g) (IA$_o$) | 89 | 89 | 89 | 2 | 2 | 2 |
| Iodine adsorption after hydrogen fluoride treatment (mg/g) (IA$_f$) | 85 | 85 | 85 | Disap. | Disap. | Disap. |
| IA$_o$/IA$_f$ | 1.047 | 1.047 | 1.047 | — | — | — |
| Properties of extracted reinforcing agent | 56 | 56 | 56 | 7 | 7 | 7 |
| Iodine adsorption (mg/g) (IA$_e$) | | | | | | |
| Iodine adsorption after hydrogen fluoride treatment (mg/g) (IA$_{ef}$) | 56 | 56 | 56 | Disap. | Disap. | Disap. |
| IA$_e$/IA$_{ef}$ | 1.000 | 1.000 | 1.000 | — | — | — |

*[1]SMR-5L
*[2]NS116 (made by Nippon Zeon)
*[3]N339: Seast KH (made by Tokai Carbon)
*[4]Nipsil AQ (made by Nippon Silica Industrial)
*[5]N339 with silica deposited on surface, amount of silica = 2% by weight
*[6]N339 with silica deposited on surface, amount of silica = 22% by weight
*[7]Si 69 (made by Degussa)
*[8]Santoflex 13 (made by Monsanto)
*[9]Santocure NS (made by Monsanto)

TABLE III

| | Ex. 1 | Ex. 2 | Ex. 3 | Ex. 4 | Ex. 5 | Ex. 6 | Ex. 7 | Ex. 8 | Ex. 9 | Ex. 10 |
|---|---|---|---|---|---|---|---|---|---|---|
| | | | | | | | | | | (Parts by weight) |
| NR*[1] | 50 | 50 | 50 | 50 | 50 | 50 | 50 | 50 | 50 | 50 |
| SBR*[2] | 50 | 50 | 50 | 50 | 50 | 50 | 50 | 50 | 50 | 50 |
| Carbon black*[3] | — | — | — | — | — | — | — | — | — | — |
| Silica*[4] | — | — | — | — | — | — | — | — | — | — |
| Surface-treated CB1*[5] | 40 | 50 | 60 | — | — | — | 40 | 60 | — | — |

TABLE III-continued

| | Ex. 1 | Ex. 2 | Ex. 3 | Ex.4 | Ex. 5 | Ex. 6 | Ex. 7 | Ex. 8 | Ex. 9 | Ex. 10 (Parts by weight) |
|---|---|---|---|---|---|---|---|---|---|---|
| Surface-treated CB2*6 | — | — | — | 40 | 50 | 60 | — | — | 40 | 60 |
| Silane coupling agent*7 | 4 | 5 | 6 | 4 | 5 | 6 | — | — | — | — |
| Zinc oxide | 3 | 3 | 3 | 3 | 3 | 3 | 3 | 3 | 3 | 3 |
| Stearic acid | 1 | 1 | 1 | 1 | 1 | 1 | 1 | 1 | 1 | 1 |
| Anti-oxidant*8 | 1 | 1 | 1 | 1 | 1 | 1 | 1 | 1 | 1 | 1 |
| Sulfur | 2 | 2 | 2 | 2 | 2 | 2 | 2 | 2 | 2 | 2 |
| Vulcanizing accelerator*9 | 1.5 | 1.5 | 1.5 | 1.5 | 1.5 | 1.5 | 1.5 | 1.5 | 1.5 | 1.5 |
| tan δ (0° C.) | 0.534 | 0.511 | 0.5 | 0.55 | 0.552 | 0.551 | 0.533 | 0.516 | 0.55 | 0.517 |
| tan δ (60° C.) | 0.085 | 0.124 | 0.163 | 0.062 | 0.091 | 0.128 | 0.095 | 0.174 | 0.055 | 0.145 |
| Electrical resistance Ωcm | $2.5 \times 10^4$ | $5.6 \times 10^2$ | $8.8 \times 10^4$ | $8.8 \times 10^7$ | $1.1 \times 10^4$ | $1.2 \times 10^4$ | $1.2 \times 10^4$ | $2.8 \times 10^2$ | $8.9 \times 10^2$ | $2.1 \times 10^3$ |
| Dispersibility of reinforcing agent | 4 | 5 | 5 | 4 | 3 | 4 | 4 | 5 | 4 | 4 |
| Properties of Reinforcing Agents used in Table III | | | | | | | | | | |
| Properties of reinforcing agent mixed in | | | | | | | | | | |
| Nitrogen specific surface area (m²/g) | 94 | 94 | 94 | 94 | 94 | 94 | 94 | 94 | 94 | 94 |
| Iodine adsorption (mg/g) (IA$_o$) | 81 | 81 | 81 | 40 | 40 | 40 | 81 | 81 | 40 | 40 |
| Iodine adsorption after hydrogen fluoride treatment (mg/g) (IA$_f$) | 82 | 82 | 82 | 83 | 83 | 83 | 82 | 82 | 83 | 83 |
| IA$_o$/IA$_f$ | 0.988 | 0.988 | 0.988 | 0.482 | 0.482 | 0.482 | 0.988 | 0.988 | 0.482 | 0.482 |
| Properties of extracted reinforcing agent | | | | | | | | | | |
| Iodine adsorption (mg/g) (IA$_e$) | 54 | 54 | 54 | 43 | 43 | 43 | 54 | 54 | 43 | 43 |
| Iodine adsorption after hydrogen fluoride treatment (mg/g) (IA$_{ef}$) | 56 | 56 | 56 | 57 | 57 | 57 | 56 | 56 | 57 | 57 |
| IA$_e$/IA$_{ef}$ | 0.964 | 0.964 | 0.964 | 0.754 | 0.754 | 0.759 | 0.964 | 0.964 | 0.754 | 0.754 |

*1SMR-5L
*2NS116 (made by Nippon Zeon)
*3N339: Seast KH (made by Tokai Carbon)
*4Nipsil AQ (made by Nippon Silica Industrial)
*5N339 with silica deposited on surface, amount of silica - 2% by weight
*6N339 with silica deposited on surface, amount of silica - 22% by weight
*7Si 69 (made by Degussa)
*8Santoflex 13 (made by Monsanto)
*9Santocure NS (made by Monsanto)

As is clear from the results shown in Table II, Table III, and FIG. 1, compared with the rubber compositions of Comparative Examples 1 to 6 where normal carbon black or silica is compounded without using the silica surface-treated carbon black, the rubber compositions of Examples 1 to 10 compounded with the surface-treated carbon black are improved in terms of the ratio of the tan δ at 0° C. and the tan δ at 60° C. even over a silica formulation (Comparative Examples 4 to 6) (high tan δ at low temperatures and low tan δ at high temperatures). Accordingly, it is possible to obtain an excellent grip and low rolling resistance. Further, in these Examples, it is possible to reduce the electrical resistance compared with a silica formulation and further to improve the dispersion in rubber.

Examples 11 to 14 and Comparative Examples 7 to 13 (Tire Tread and Undertread Use)

Various rubber compositions were prepared by mixing and kneading in a Banbury mixer and kneading roll machine by the formulation shown in the following formulation Table and Table IV (parts by weight) and by an ordinary method. These rubber compositions were press-vulcanized at 160° C. for 20 minutes to prepare the desired test pieces which were then subjected to various tests. The results are shown in Table IV. Note that the values of the properties of the reinforcing agent are the values including the carbon black and silica.

Note that the WSR (Wet Skid Resistance) test, the indicator of the grip on wet roads, was performed as follows:

That is, a British Pendulum Tester was used and the measurement was made on a safety walk type B wet by room temperature water as a road surface. The measured values were shown indexed to the standard formulation as 100. The larger the figures, the better the grip. The results are shown in Table V.

| Formulation | |
|---|---|
| Component | Parts by weight |
| NR*1 | 50 |
| SBR*2 | 50 |
| Reinforcing agent*3 | 50 |

-continued

| Formulation | |
|---|---|
| Component | Parts by weight |
| Zinc oxide | 3 |
| Stearic acid | 2 |
| Antioxidant*4 | 1 |
| Silane coupling agent*5 | Variable*6 |
| Sulfur | 2 |
| Vulcanizing accelerator NS*7 | 1 |
| Vulcanizing accelerator DPG*8 | 0.3 |

*1: TTR-20
*2: NS114 (SBR made by Nippon Zeon)
*3: Carbon black: HAF class, Seast KH (made by Tokai Carbon)
Silica: Nipseal AQ (made by Nippon Silica Industrial)
Surface-treated carbon black: Seast KH (made by Tokai Carbon) having silica adhered to the surface thereof
*4: Nocrac 6C (made by Ouchi Shinko Chemical Industrial)
*5: Si69 (made by Degussa)
*6: When using silica as a reinforcing agent: 8% by weight of silica was compounded
When compounding in surface-treated carbon black, not added.
*7: Nocceler NS-F (made by Ouchi Shinko Chemical Industrial)
*8: Nocceler D (made by Ouchi Shinko Chemical Industrial)

and 14), compared with the example of compounding of carbon black and silica to give the same ratio of silica (Comparative Examples 10 to 12) and the example where the amount of the surface-treated carbon black compounded has not reached the suitable amount (Comparative Example 13), the electrical resistance, dispersibility, and WSR were all good.

Examples 15 to 18 and Comparative Examples 14 to 18 (for Cap Tread Use: High Filler Ratio Type)

Various rubber compositions were prepared by mixing and kneading by a Banbury mixer and kneading roll machine by the formulation shown in the following formulation Table and Table V (parts by weight) by an ordinary method. These rubber compositions were press-vulcanized at 160° C. for 20 minutes to prepare the desired test pieces which were then subjected to various tests. The results were as follows:

TABLE IV

| | Comp. Ex. 7 | Ex. 11 | Ex. 12 | Comp. Ex. 8 | Comp. Ex. 9 | Comp. Ex. 10 | Comp. Ex. 11 | Comp. Ex. 12 | Comp. Ex. 13 | Ex. 13 | Ex. 14 |
|---|---|---|---|---|---|---|---|---|---|---|---|
| SBR*1 | 50/50 | 50/50 | 50/50 | 50/50 | 50/50 | 50/50 | 50/50 | 50/50 | 50/50 | 50/50 | 50/50 |
| Carbon black*2 | 50 | — | — | — | — | 49 | 39 | 30 | 46 | 40 | 30 |
| Surface-treated CB1 | — | 50 | — | — | — | — | — | — | 4 | 10 | 20 |
| Surface-treated CB2 | — | — | 50 | — | — | — | — | — | — | — | — |
| Surface-treated CB3*3 | — | — | — | 50 | — | — | — | — | — | — | — |
| Silica | — | — | — | — | 50 | 1 | 11 | 20 | — | — | — |
| WSR | 100 | 103 | 107 | 106 | 104 | 100 | 101 | 103 | 101 | 103 | 104 |
| tan δ 60° C. | 100 | 87 | 64 | 67 | 92 | 99 | 93 | 97 | 99 | 97 | 96 |
| Electrical resistance (Ωcm) | 1.90E+03 | 2.00E+03 | 1.00E+06 | 1.80E+13 | 2.00E+13 | 8.90E+02 | 7.90E+05 | 1.00E+07 | 2.10E+03 | 5.30E+03 | 5.70E+03 |
| Dispersibility | 4 | 5 | 5 | 2 | 2 | 4 | 2 | 2 | 4 | 5 | 4 |
| Properties of Reinforcing Agents Used in Table IV | | | | | | | | | | | |
| Properties of reinforcing agent mixed in | | | | | | | | | | | |
| Nitrogen specific surface area (m²/g) | 94 | 94 | 94 | 95 | 193 | 96 | 119 | 132 | 94 | 95 | 94 |
| Iodine adsorption (mg/g) (IA$_o$) | 89 | 81 | 40 | 4 | 2 | 86 | 70 | 55 | 88 | 87 | 68 |
| Iodine adsorption after hydrogen fluoride treatment (mg/g) (IA$_f$) | 85 | 82 | 83 | 83 | Disap. | 85 | 85 | 85 | 85 | 84 | 67 |
| IA$_o$/IA$_f$ | 1.047 | 0.988 | 0.482 | 0.048 | — | 1.012 | 0.824 | 0.647 | 1.035 | 1.036 | 1.015 |
| Properties of extracted reinforcing agent | | | | | | | | | | | |
| Iodine adsorption (mg/g) (IA$_e$) | 56 | 54 | 43 | 8 | 7 | 55 | 45 | 37 | 56 | 56 | 55 |
| Iodine adsorption after hydrogen fluoride treatment (mg/g) (IA$_{ef}$) | 56 | 56 | 57 | 57 | Disap. | 57 | 57 | 56 | 57 | 57 | 57 |
| IA$_e$/IA$_{ef}$ | 1.000 | 0.964 | 0.754 | 0.140 | — | 0.965 | 0.789 | 0.661 | 0.982 | 0.982 | 0.965 |

*1 NS114 (made by Nippon Zeon)
*2 Carbon black N339: Seast KH (made by Tokai Carbon)
*3 Surface-treated CB3: Seast KH (made by Tokai Carbon) having silica deposited on the surface thereof, amount of silica = 74% by weight As is clear from the results of Table IV, in the case of compounding of the silica surface-treated carbon black of the present invention in place of ordinary carbon black (Examples 11 and 12), compared with the case of the compounding of only carbon black (Comparative Example 7), the WSR (indicator: higher the better) and balance of tan δ 60° C. (indicator: lower the better) were excellent.

On the other hand, in the case of the use of suitable amounts of carbon black in combination with the surface-treated carbon black of the present invention (Examples 13

| Formulation | |
|---|---|
| Component | Parts by weight |
| SBR*1 | 100 |
| Reinforcing agent*2 | 80 |
| Aromatic oil | 50 |
| Zinc oxide | 3 |

-continued

| Formulation | |
|---|---|
| Component | Parts by weight |
| Stearic acid | 2 |
| Antioxidant*3 | 1 |
| Silane coupling agent*4 | Variable*5 |
| Sulfur | 2 |
| Vulcanizing accelerator NS*6 | 1 |
| Vulcanizing accelerator DPG*7 | 0.4 |

*1: Nipol 1502 (made by Nippon Zeon)
*2: Carbon black: SAF class, Seast 9 (made by Tokai Carbon)
Silica: Nipseal AQ (made by Nippon Silica Industrial)
Surface-treated carbon black: Seast 9 (made by Tokai Carbon) having silica adhered to the surface thereof
*3: Nocrac 6C (made by Ouchi Shinko Chemical Industrial)
*4: Si69 (made by Degussa)
*5: When using silica as a reinforcing agent: 8% by weight of silica compounded
When mixing in surface-treated carbon black, 8% by weight of silica compounded.
*6: Nocceller NS-F (made by Ouchi Shinko Chemical Industrial)
*7: Nocceller D (made by Ouchi Shinko Chemical Industrial)

Example 19 and Comparative Examples 19 to 20 (Side Tread Use)

Various rubber compositions were prepared by mixing and kneading is a Banbury mixer and kneading roll machine by the formulation shown in the following formulation Table and Table VI (parts by weight) and by an ordinary method. These rubber compositions were press-vulcanized at 160° C. for 20 minutes to prepare the desired test pieces which were then subjected to various tests. The results are shown in Table VI.

The standard formulation was as follows:

| Formulation | |
|---|---|
| Component | Parts by weight |
| NR*1 | 50 |
| BR*2 | 50 |
| Reinforcing agent*3 | 50 |
| Aromatic oil | 7 |

TABLE V

| | Comp. Ex. 14 | Comp. Ex. 15 | Ex. 15 | Ex. 16 | Comp. Ex. 16 | Comp. Ex. 17 | Comp. Ex. 18 | Ex. 17 | Ex. 18 |
|---|---|---|---|---|---|---|---|---|---|
| SBR* | 100 | 100 | 100 | 100 | 100 | 100 | 100 | 100 | 100 |
| Aroma oil | 50 | 50 | 50 | 50 | 50 | 50 | 50 | 50 | 50 |
| Carbon black (SAF)*1 | 80 | — | — | — | — | 60 | 73 | 60 | 50 |
| Surface-treated CB4*2 | — | — | 80 | — | — | — | 7 | 20 | 30 |
| Surface-treated CB5*3 | — | — | — | 80 | — | — | — | — | — |
| Surface-treated CB6*4 | — | — | — | — | 80 | — | — | — | — |
| Silica | — | 80 | — | — | — | 20 | — | — | — |
| WSR | 95 | 93 | 96 | 98 | 97 | 96 | 94 | 97 | 96 |
| E' −5° C. | 18.82 | 11.42 | 11.6 | 11.92 | 11.87 | 14.97 | 18.66 | 14.89 | 14.64 |
| E' 55° C. | 5.05 | 5.7 | 5.72 | 5.91 | 5.88 | 5.48 | 4.98 | 5.5 | 5.61 |
| Electrical resistance (Ωcm) | <1.0E + 03 | 2.80E + 13 | <1.0E + 03 | <1.0E + 03 | 4.30E + 12 | <1.0E + 03 | <1.0E + 03 | <1.0E + 03 | <1.0E + 03 |
| Dispersibility | 4 | 1 | 5 | 5 | 2 | 2 | 5 | 5 | 5 |
| Properties of Reinforcing Agents Used in Table V | | | | | | | | | |
| Properties of reinforcing agent mixed in | | | | | | | | | |
| Nitrogen specific surface area (m²/g) | 144 | 193 | 145 | 144 | 144 | 157 | 152 | 145 | 145 |
| Iodine adsorption (mg/g) ($IA_o$) | 137 | 2 | 125 | 84 | 10 | 103 | 124 | 134 | 132 |
| Iodine adsorption after hydrogen fluoride treatment (mg/g) ($IA_f$) | 131 | Disap. | 130 | 129 | 129 | 130 | 129 | 129 | 129 |
| $IA_o/IA_f$ | 1.046 | — | 0.962 | 0.651 | 0.078 | 0.792 | 0.961 | 1.039 | 1.023 |
| Properties of extracted reinforcing agent | | | | | | | | | |
| Iodine adsorption (mg/g) ($IA_e$) | 87 | 6 | 79 | 81 | 8 | 66 | 86 | 85 | 84 |
| Iodine adsorption after hydrogen fluoride treatment (mg/g) ($IA_{ef}$) | 87 | Disap. | 88 | 87 | 89 | 87 | 87 | 87 | 87 |
| $IA_e/IA_{ef}$ | 1.000 | — | 0.898 | 0.931 | 0.090 | 0.759 | 0.989 | 0.977 | 0.966 |

*1Carbon black N110 Seast 9 (made by Tokai Carbon)
*1Surface treated CB4: Seast 9 (made by Tokai Carbon) surface given deposit of silica, amount of silica = 3% by weight
*3Surface treated CB5: Seast 9 (made by Tokai Carbon) surface given deposit of silica, amount of silica = 25% by weight
*4Surface treated CB6: Seast 9 (made by Tokai Carbon) surface given deposit of silica, amount of silica = 58% by weight As is clear from the results of Table V, by compounding in the surface-treated carbon black of the present invention, it is possible to obtain a rubber composition having a high WSR, a small temperature dependence of the E', a low electrical resistance, and an excellent dispersion of the filler.

-continued

| Formulation | |
|---|---|
| Component | Parts by weight |
| Zinc oxide | 3 |
| Stearic acid | 2 |

-continued

Formulation

| Component | Parts by weight |
|---|---|
| Antioxidant*4 | 3 |
| Wax*5 | 1 |
| Silane coupling agent*6 | Variable*7 |
| Sulfur | 2 |
| Vulcanizing accelerator NS*8 | 1 |
| Vulcanizing accelerator DPG*9 | 0.2 |

*1: TTR-20
*2: Niol BR 1220 (made by Nippon Zeon)
*3: Carbon black: FEF class, Seast SO (made by Tokai Carbon)
Silica: Nipseal AQ (made by Nippon Silica Industrial)
Surface-treated carbon black: Seast SO (made by Tokai Carbon) having silica adhered to the surface thereof
*4: Nocrac 6C (made by Ouchi Shinko Chemical Industrial)
*5: Suntite R (made by Seiko Kagaku)
*6: Si69 (made by Degussa)
*7: When using silica as a reinforcing agent: 8% by weight of silica compounded
When mixing in surface-treated carbon black, 8% by weight of silica compounded.
*8: Nocceller NS-F (made by Ouchi Shinko Chemical Industrial)
*9: Nocceller D (made by Ouchi Shinko Chemical Industrial)

TABLE VI

|  | Comp. Ex. 19 | Comp. Ex. 20 | Ex. 19 |
|---|---|---|---|
| NR/BR | 50/50 | 50/50 | 50/50 |
| Aroma oil | — | — | — |
| CB (HAF)1) | 50 | 40 | 40 |
| Surface-treated CB7 2) | — | — | 10 |
| Silica | — | 10 | — |
| tan δ 60° C. | 100 | 93 | 89 |
| tearB (kg/cm) | 57 | 62 | 162 |
| Dispersibility | 5 | 3 | 5 |
| Properties of Reinforcing Agents Used in Table VI | | | |
| Properties of reinforcing agent mixed in | | | |
| Nitrogen specific surface area (m²/g) | 42 | 63 | 42 |
| Iodine adsorption (mg/g) (IA$_o$) | 44 | 35 | 42 |
| Iodine adsorption after hydrogen fluoride treatment (mg/g) (IA$_f$) | 43 | 60 | 44 |
| IA$_o$/IA$_f$ | 1.023 | 0.583 | 0.955 |
| Properties of extracted reinforcing agent | | | |
| Iodine adsorption (mg/g) (IA$_u$) | 39 | 32 | 37 |
| Iodine adsorption after hydrogen fluoride treatment (mg/g) (IA$_{uf}$) | 39 | 38 | 39 |
| IA$_u$/IA$_{uf}$ | 1.000 | 0.842 | 0.949 |

1)Seast SO (made by Tokai Carbon)
2)Seast SO (made by Tokai Carbon) having silica deposited on the surface thereof amount of silica = 5% by weight.

As is clear from the results of Table VI, by using the surface-treated carbon black of the present invention, it is possible to obtain a rubber composition having a low tan δ (60° C.) and a high tear strength (tear B) and superior in dispersion of the filler.

The rubber composition according to the present invention exhibits a superior balance between the high temperature region tan δ and the low temperature region tan δ at least equivalent to that of silica, so can give a rubber composition giving a rubber product superior in durability and, further, has a smaller electrical resistance than a conventional silica filler, and therefore, is free from the problems of noise at radios and other electronic equipment and inflammation and is excellent as well in the dispersion in the compound.

We claim:

1. A rubber composition comprising at least one cross-linkable rubber component and a silica surface-treated carbon black having silica adhered to the surface thereof.

2. A rubber composition as claimed in claim 1, wherein the amount of the silica surface-treated carbon black is 10 to 200 parts by weight per 100 parts by weight of the rubber component.

3. A rubber composition as claimed in claim 1 further comprising a silane coupling agent in an amount of S (parts by weight) satisfying the following equation, with respect to the amount of W (parts by weight) of the silica surface-treated carbon black:

$$W \times 0.05 \times [1-(IA_o/IA_f)] \leq S \leq W \times 0.20$$

wherein, $IA_o$ is the adsorption amount of iodine of the silica surface-treated carbon black and $IA_f$ is the adsorption amount of iodine after treated by hydrogen fluoride.

4. A rubber composition as claimed in claim 1, wherein the content of the silica in the silica surface-treated carbon black is 0.1 to 50% by weight.

5. A rubber composition as claimed in claim 1 suitable for use in tire tread comprising 100 parts by weight of at least one rubber component selected from cross-linkable rubbers and 30 to 150 parts by weight of silica surface-treated carbon black, the content of said silica in the silica surface-treated carbon black being 0.1 to 50% by weight.

6. A rubber composition as claimed in claim 1 suitable for use in tire tread comprising 100 parts by weight of at least one rubber component selected from cross-linkable rubbers and 30 to 150 parts by weight of a filler composed of 10% by weight or more of a silica surface-treated carbon black and 90% by weight or less of carbon black, the content of the silica in the silica surface-treated carbon black being 0.1 to 50% by weight.

7. A rubber composition as claimed in claim 1 suitable for use in tire undertread or side tread, comprising 100 parts by weight of at least one rubber component selected from cross-linkable rubbers and 30 to 120 parts by weight of silica surface-treated carbon black, the content of the silica in the silica surface-treated carbon black being 0.1 to 50% by weight.

8. A rubber composition as claimed in claim 1 suitable for use in tire undertread or side tread, comprising 100 parts by weight of at least one rubber component selected from cross-linkable rubbers and 30 to 120 parts by weight of a filler comprising 10% by weight or more of the silica surface-treated carbon black and 90% by weight or less of carbon black, the content of the silica in the silica surface-treated carbon black being 0.1 to 50% by weight.

9. A rubber composition as claimed in claim 1, suitable for use in tire tread, comprising of 100 parts by weight of at least one rubber component selected from natural rubber, polybutadiene rubber, styrene-butadiene rubber, polybutadiene rubber containing 1,2-syndiotatic polybutadiene, and natural rubber and polybutadiene rubber containing microfilaments and 30 to 150 parts by weight of silica surface-treated carbon black.

10. A rubber composition as claimed in claim 1, wherein the nitrogen specific surface area ($N_2SA$) of the silica surface-treated carbon black is 20 to 300 m²/g.

11. A rubber composition as claimed in claim 1, wherein the silica surface-treated carbon black has a ration $IA_o/IA_f$ of the adsorption amount of iodine ($IA_o$) and the adsorption amount of iodine after treatment by hydrogen fluoride ($IA_f$) of at least 0.30 but less than 1.0 and a ratio $IA/IA_{ef}$ of the adsorption amount of iodine after extraction from a rubber compound ($IA_e$) and the value of the same after treatment by hydrogen fluoride ($IA_{ef}$) of at least 0.30 but less than 1.0.

12. A silica surface-treated carbon black comprising carbon black having silica adhered to the surface thereof, wherein the nitrogen specific surface area ($N_2SA$) of the silica surface-treated carbon black is 20 to 300 m²/g, the ratio $IA_o/IA_f$ of the adsorption amount of iodine ($IA_o$) and the adsorption amount of iodine after treatment by hydrogen fluoride ($IA_f$) is at least 0.30 but less than 1.0, and the ratio $IA_e/IA_{ef}$ of the adsorption amount of iodine after extraction from a rubber compound ($IA_e$) and the value of the same after treatment by hydrogen fluoride ($IA_{ef}$) is at least 0.30 and less but 1.0.

* * * * *

UNITED STATES PATENT AND TRADEMARK OFFICE
CERTIFICATE OF CORRECTION

PATENT NO. : 5,679,728
DATED : October 21, 1997
INVENTOR(S) : Tetsuji Kawazura et al.

It is certified that error appears in the above-indentified patent and that said Letters Patent is hereby corrected as shown below:

On the title page: Item [76] Inventors:  change "Hiratuska" to --Hiratsuka--.

Claim 11, column 17, line 2, "ration" should read --ratio--.

Signed and Sealed this

Thirty-first Day of March, 1998

Attest:

BRUCE LEHMAN

*Attesting Officer*     *Commissioner of Patents and Trademarks*

UNITED STATES PATENT AND TRADEMARK OFFICE
CERTIFICATE OF CORRECTION

PATENT NO. : 5,679,728
DATED : October 21, 1997
INVENTOR(S) : Tetsuji Kawazura et al.

It is certified that error appears in the above-identified patent and that said Letters Patent is hereby corrected as shown below:

Claim 12, column 18, line 8, change "and less but" to --but less than--.

Signed and Sealed this

Twentieth Day of February, 2001

*Attest:*

NICHOLAS P. GODICI

*Attesting Officer*  Acting Director of the United States Patent and Trademark Office